Jan. 23, 1934.     J. P. LE MAY     1,944,663
FORCED FEED FAUCET FOR DISPENSING PLASTICS
Filed Aug. 25, 1932
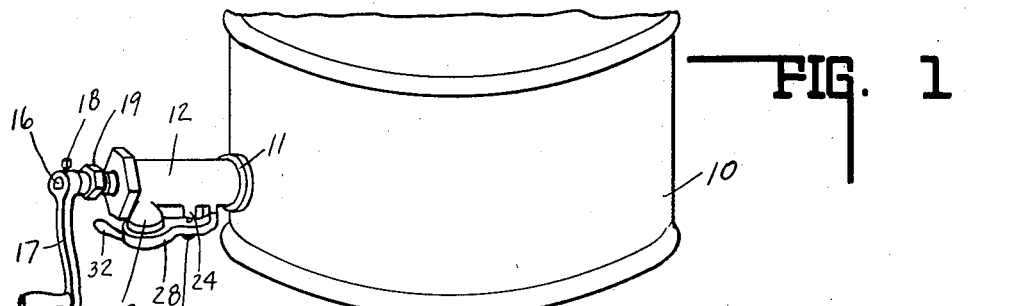
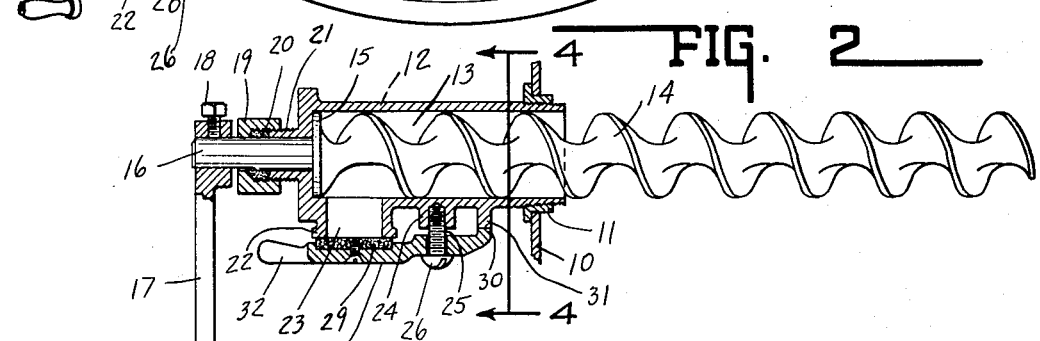
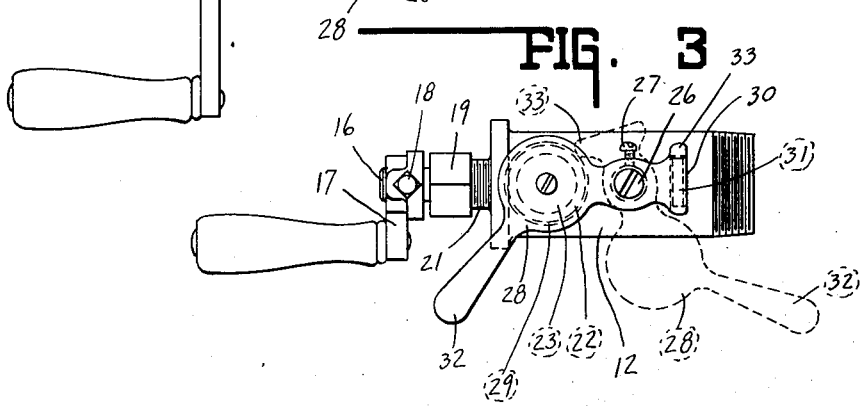
INVENTOR.
J. PAUL LE MAY.
BY
Lockwood Lockwood Goldsmith & Galt
ATTORNEYS.

Patented Jan. 23, 1934

1,944,663

UNITED STATES PATENT OFFICE 1,944,663

FORCED FEED FAUCET FOR DISPENSING PLASTICS

J. Paul Le May, Casey, Ill.

Application August 25, 1932. Serial No. 630,410

2 Claims. (Cl. 221—146)

This invention relates to a faucet which is particularly useful for dispensing plastic materials, such as roof cement, fibered roof coatings, extremely heavy oils. malted extracts, and other similar substances, from the container in which they are received from the manufacturer.

The faucet consists of a body portion which may be threadedly connected with the usual bung hole of the barrel or steel drum in which this class of material is ordinarily shipped. The body portion is formed with an interior chamber communicating through the bung hole with the interior of the container. A conveyor screw is positioned within the chamber and extends a sufficient distance into the container so that when rotated, the material within the container is drawn into the chamber and is discharged therefrom through a suitable discharge opening formed in the body member. The screw serves not only to withdraw the material from the container, but also to mix the same to produce a homogeneous material if the ingredients of the same have become separated.

One of the principal features of the invention resides in the form of closure for the discharge opening. Said closure is so arranged that it is wedged against the discharge opening during the closing movement and thus gives a sufficiently tight seal so that the screw may be rotated for mixing purposes without discharging any of the material through the discharge opening.

Another feature of the invention consists in the construction of the closure mechanism in such manner that the closure handle and the crank handle for turning the screw are each positioned in a convenient place for operation, but cannot interfere with each other.

Other objects and features of the invention and the full nature thereof will be understood from the following specification and claims and the accompanying drawing:

In the drawing, Fig. 1 is a perspective view showing the faucet attached to a steel drum container. Fig. 2 is a longitudinal sectional view through the faucet and a portion of the wall of said drum. Fig. 3 is a bottom view of the faucet. Fig. 4 is a sectional view taken on the line 4—4 of Fig. 2.

In the drawing a steel drum container 10 has the usual bushing 11 welded therein to form a threaded bung hole. The body member 12 of the faucet is threadedly engaged at one end with the internal threads of the bushing 11 and is formed with an internal chamber 13 communicating with the interior of the container 10. A conveyor screw 14 is placed with one end positioned within the chamber 13 and the opposite end projecting into the container 10. It will be seen from Fig. 2 that the major portion of the length of the screw is within the container so that the screw may serve not only as a conveying means, but as a mixing means for the contents of the container.

The outer end of the screw 14 is fitted with a flange 15 abutting against the end of the chamber 13. A shank 16 is formed on said flange and extends through a suitable opening in the body member 12. A hand crank 17 is fastened to the shank 16 by means of a set screw 18 and serves to rotate the screw for withdrawing the contents of the container or for mixing the same. A stuffing box 19 containing packing material 20 is threadedly engaged upon a projection 21 of the body member 12 to prevent escape of the material along the shank 16.

On the lower side of the body member 12 there is formed a boss 22 having a discharge opening 23 therein. Communicating with the chamber 13, a second boss 24 is also formed on the under surface of the body member 12 and carries a stud 25 having a head 26 and held in place by a set screw 27. A closure construction consisting of a metallic member 28, having a disk 29, of leather or other packing material, inset therein, is mounted on the stud 25. The closure construction is free to rotate upon said stud and in such rotation it may be moved between the positions shown in Fig. 3 in solid and dotted lines. In this movement, it will be seen that the packing disk 29 is moved transversely across the discharge opening 23.

The closure construction is also movable longitudinally of the axis of the stud 25, this movement being limited in one direction by the boss 24 and in the opposite direction by the head 26 of the stud. At the inner end of the metallic member 28 of the closure construction, there is formed a wedge member 30 which engages a mating wedge member 31 carried upon the body member 12. The wedge members 30 and 31 are so formed that as the closure construction is rotated to bring the packing disk 29 over the discharge opening 23, the wedge members engage and force the inner end of the closure member downwardly against the head of the stud 26. The position of said stud is so adjusted that the head 26 thereof serves as a fulcrum and the packing disk 29 is, therefore, forced upwardly against the edges of the discharge opening 23 by the action of the wedge members 30 and 31. A fluid-tight seal is thus produced which prevents the escape of the contents of the container, even though the screw 14 is rotated for mixing purposes.

The closure construction is fitted with a handle 32. In the closed position of the closure construction, the handle 32 projects towards the path of movement of the hand crank 17. However, this movement is limited by a stop member 33 formed on the wedge member 30, which stop member engages the wedge member 31. In the movement of the handle 32 in the opposite direction, the stop member 33 engages the boss 22. Thus, although the handle 32 is of sufficient length to reach the path of travel of the hand crank 17, still the stop member 33 prevents any possible interference between the two. At the same time, both the hand crank 17 and the handle 32 are conveniently positioned for operation.

It will be seen from the foregoing description that the invention provides an extremely convenient and efficient means for withdrawing plastic materials from a container in addition to means for mixing the said materials without withdrawal thereof or during such withdrawal.

The invention claimed is:

1. A faucet for dispensing plastics and the like from a container, including a body member having a central chamber therein, said body member being insertable in an opening in said container and said chamber communicating with the interior of said container, said body member also having a discharge opening adjacent the outer end thereof, a screw mounted within said chamber and extending into said container, means for rotating said screw to draw the contents of said container into said chamber and to discharge the same through said discharge opening, a headed stud mounted on said body member, a closure construction mounted on said stud and having both a rotating and a longitudinal movement with respect to the axis of said stud, said closure being movable transversely across said discharge opening in said rotating movement, and said longitudinal movement being limited by the head of said stud, a wedge member carried on said closure construction, and a mating wedge member carried on said body member and engageable with the first-mentioned wedge member in the rotation of said closure construction to move the same longitudinally along said stud to engage the head thereof as a fulcrum and thereafter to press said closure against said discharge opening for closing the same.

2. A faucet for dispensing plastics and the like from a container, including a body member having a central chamber therein, said body member being insertable in an opening in said container and said chamber communicating with the interior of said container, said body member also having a discharge opening adjacent the outer end thereof, said discharge opening being formed in a boss projecting from said body member, a screw mounted within said chamber and extending into said container, said screw having a shank projecting through a wall of said body member, a crank attached to said shank for rotating said screw to draw the contents of said container into said chamber and to discharge the same through said discharge opening, a headed stud mounted on said body member, a closure construction mounted on said stud and having both a rotating and a longitudinal movement with respect to the axis of said stud, said closure construction being movable transversely across said discharge opening in said rotating movement, and said longitudinal movement being limited by the head of said stud, a wedge member carried on said closure construction, and a mating wedge member carried on said member and engageable with the first-mentioned wedge member in the rotation of said closure construction to move the same longitudinally along said stud to engage the head thereof as a fulcrum and thereafter to press said closure against said discharge opening for closing the same, said closure construction including a handle projecting toward the path of travel of said crank.

J. PAUL LE MAY.